(12) United States Patent
Wang et al.

(10) Patent No.: US 11,239,789 B2
(45) Date of Patent: Feb. 1, 2022

(54) FLOATING PHOTOVOLTAIC POWER STATION AND LOAD-BEARING SYSTEM THEREOF

(71) Applicant: HUAINAN SUNGROW FLOATING MODULE SCI. & TECH. CO., LTD., Anhui (CN)

(72) Inventors: Lihua Wang, Anhui (CN); Yukun Wang, Anhui (CN); Duo Li, Anhui (CN); Fuqin Xiao, Anhui (CN); Weiwu Wu, Anhui (CN)

(73) Assignee: HUAINAN SUNGROW FLOATING MODULE SCI. & TECH. CO., LTD. (CN)

(*) Notice: Subject to any disclaimer, the term of this patent is extended or adjusted under 35 U.S.C. 154(b) by 53 days.

(21) Appl. No.: 16/793,702

(22) Filed: Feb. 18, 2020

(65) Prior Publication Data
US 2020/0313601 A1    Oct. 1, 2020

(30) Foreign Application Priority Data

Mar. 29, 2019   (CN) .................. 201910252960.X

(51) Int. Cl.
*H02S 10/40* (2014.01)
*H02S 20/00* (2014.01)
*B63B 35/44* (2006.01)

(52) U.S. Cl.
CPC .............. *H02S 10/40* (2014.12); *B63B 35/44* (2013.01); *H02S 20/00* (2013.01); *B63B 2035/4453* (2013.01)

(58) Field of Classification Search
CPC .. H02S 10/40; H02S 20/00; B63B 2035/4453
See application file for complete search history.

(56) References Cited

U.S. PATENT DOCUMENTS 9,849,945 B2    12/2017  Gaveau
2012/0090667 A1   4/2012  Cap et al.
(Continued)

FOREIGN PATENT DOCUMENTS

CN    205389187    7/2016
CN    105857535    8/2016
(Continued)

OTHER PUBLICATIONS

European Search Report issued in European Application No. 20154085.3 dated Aug. 5, 2020.

*Primary Examiner* — Jayne L Mershon
(74) *Attorney, Agent, or Firm* — The Belles Group, P.C.

(57) ABSTRACT

A floating photovoltaic power station and a load-bearing system thereof are provided according to the present application. The load-bearing system of the floating photovoltaic power station includes an aisle floating body providing buoyancy and forming a first operation and maintenance passage. The aisle floating body is provided with a fixing portion for fixedly connecting with a front side of a photovoltaic assembly, and one photovoltaic assembly is only fixedly connected to one aisle floating body located on the front side of the photovoltaic assembly. In the load-bearing system of the floating photovoltaic power station, the aisle floating body can support the photovoltaic assembly, and can provide buoyancy at the same time.

18 Claims, 10 Drawing Sheets

(56) References Cited

U.S. PATENT DOCUMENTS

2016/0368577 A1* 12/2016 Gaveau .................. F24S 25/11
2019/0219305 A1   7/2019 Correia et al.
2019/0341880 A1  11/2019 Wang et al.

FOREIGN PATENT DOCUMENTS

| CN | 105857535 | * | 8/2017 | |
|----|-----------|---|--------|---|
| JP | 3218510 | | 10/2018 | |
| KR | 101171683 | | 8/2012 | |
| KR | 101171683 B1 | * | 8/2012 | ............. F24S 20/70 |
| WO | WO 2010/144955 | | 12/2010 | |
| WO | WO 2018/055471 | | 3/2018 | |

* cited by examiner

FLOATING PHOTOVOLTAIC POWER STATION AND LOAD-BEARING SYSTEM THEREOF

CROSS REFERENCE TO RELATED APPLICATIONS

The present application claims priority to Chinese Patent Application No. 201910252960.X, entitled "FLOATING PHOTOVOLTAIC POWER STATION AND LOAD-BEARING SYSTEM THEREOF," which was filed on Mar. 29, 2019, the entirety of which is incorporated herein by reference.

FIELD

The present application relates to the technical field of a floating power station, more specifically to a floating photovoltaic power station and a load-bearing system thereof.

BACKGROUND

In order to save land resources, floating photovoltaic power stations are gradually widely used. In a floating photovoltaic power station, a load-bearing system needs to be provided to support a photovoltaic assembly. Specifically, the load-bearing system mainly includes a floating body and a bracket, the floating body only provides buoyancy, the bracket is arranged on the floating body, and the bracket supports the photovoltaic assembly. In the above structure, the photovoltaic assembly is supported only by the bracket, which results in high cost.

In summary, how to design a load-bearing system to reduce costs is an urgent problem to be solved by those skilled in the art.

SUMMARY

An object of the present application is to provide a load-bearing system of a floating photovoltaic power station to reduce costs. Another object of the present application is to provide a floating photovoltaic power station having the above load-bearing system.

In order to achieve the above objects, the following technical solutions are provided according to the present application.

A load-bearing system of a floating photovoltaic power station includes an aisle floating body providing buoyancy and forming a first operation and maintenance passage. The aisle floating body is provided with a fixing portion for fixedly connecting with a front side of a photovoltaic assembly, and one photovoltaic assembly is only fixedly connected to one aisle floating body located on the front side of the photovoltaic assembly.

Preferably, the photovoltaic assembly is in one-to-one correspondence with the aisle floating body located on the front side thereof.

Preferably, the aisle floating body is provided with a hook for fitting with a snap hole of the photovoltaic assembly to prevent the photovoltaic assembly from detaching, and/or a first clamping portion for pressing the photovoltaic assembly against the fixing portion.

Preferably, the load-bearing system further includes an auxiliary floating body arranged in parallel with the aisle floating body and forming a second operation and maintenance passage, and the auxiliary floating body is fixedly connected with the aisle floating body.

Preferably, at least two aisle floating bodies are provided, and are arranged in rows in a predetermined direction, and two adjacent aisle floating bodies in each row are fixedly connected.

Preferably, at least two rows of the aisle floating bodies are provided, and the load-bearing system further includes a connection cover plate fixedly connected with an end portion of each row of the aisle floating bodies, and a device floating body fixedly connected with the two adjacent connection cover plates.

Preferably, at least one of the aisle floating body, the connection cover plate and the device floating body has a hollow structure. The hollow structure includes an enclosed housing, and the enclosed housing has a sealed chamber. The sealed chamber is an empty chamber, or the sealed chamber is provided with fillers.

Preferably, two adjacent aisle floating bodies of each row are fixedly connected by a connecting floating body.

Preferably, the load-bearing system of a floating photovoltaic power station further includes a support bracket for fixedly connecting with a rear side of the photovoltaic assembly. One end of the support bracket is fixedly connected with the aisle floating body located on the front side of the photovoltaic assembly, and another end of the support bracket is fixedly connected with the aisle floating body located on the rear side of the photovoltaic assembly.

Preferably, the support bracket spans the aisle floating body, and the aisle floating body is provided with an avoidance groove for accommodating the support bracket.

Preferably, at least two of the support brackets are arranged end to end, and the two support brackets are rotatably connected in a vertical plane.

Preferably, in a length direction of the support bracket, the support bracket is located between the two adjacent aisle floating bodies.

Preferably, the support bracket includes a support bracket body and connecting portions fixedly connecting with the aisle floating body, wherein two connecting portions are provided and respectively connected to two ends of the support bracket body, and at least one of the connecting portions is rotatably connected with the support bracket body in the vertical plane.

Preferably, at least one connecting portion is provided with a position-limiting component for limiting a movement of the support bracket body in a width direction of the support bracket body.

Preferably, the support bracket is provided with a second clamping portion for pressing the photovoltaic assembly against the support bracket.

Preferably, the support bracket includes a connecting rod and a bracket fixedly connecting with the connecting rod, wherein the bracket is configured to fixedly connect with the rear side of the photovoltaic assembly, one end of the connecting rod is fixedly connected with the aisle floating body located on the front side of the photovoltaic assembly, and another end of the connecting rod is fixedly connected with the aisle floating body located on the rear side of the photovoltaic assembly.

Preferably, the bracket includes a first sub-bracket body and a second sub-bracket body that are spliced and fixedly connected, wherein a mounting structure is formed at a splicing portion of the first sub-bracket body and the second sub-bracket body, and the connecting rod passes through the mounting structure.

Preferably, the mounting structure is a closed annular structure.

Preferably, the connecting rod, the first sub-bracket body and the second sub-bracket body are fixedly connected by a same connecting component.

Based on the above load-bearing system of a floating photovoltaic power station, a floating photovoltaic power station is further provided according to the present application. The floating photovoltaic power station includes a photovoltaic assembly and a load-bearing system bearing the photovoltaic assembly, wherein the load-bearing system is the load-bearing system according to any one of the above aspects.

In the load-bearing system of the floating photovoltaic power station according to the present application, the aisle floating body providing buoyancy and forming the first operation and maintenance passage is fixedly connect with the front side of the photovoltaic assembly, so that the aisle floating body can support the photovoltaic assembly, and can provide buoyancy at the same time. Compared with the floating body only providing buoyancy in the conventional technology, the number of components is reduced, thereby effectively reducing the cost.

Moreover, in the load-bearing system of the floating photovoltaic power station according to the present application, when the wave fluctuation causes displacement difference of the adjacent aisle floating bodies, since one photovoltaic assembly is only fixedly connected to one aisle floating body located on the front side thereof, the influence of the displacement difference on the single photovoltaic assembly is effectively reduced, thereby reducing the probability of damage to the photovoltaic assembly and prolonging the service life of the photovoltaic assembly.

BRIEF DESCRIPTION OF THE DRAWINGS

For more clearly illustrating embodiments of the present application or the technical solutions in the conventional technology, drawings for the description of the embodiments or the conventional technology will be briefly described hereinafter. The drawings in the following description are only examples of the present application, and for the person skilled in the art, other drawings may be obtained based on the provided drawings without any creative efforts.

DETAILED DESCRIPTION OF THE EMBODIMENTS

Figure 1:
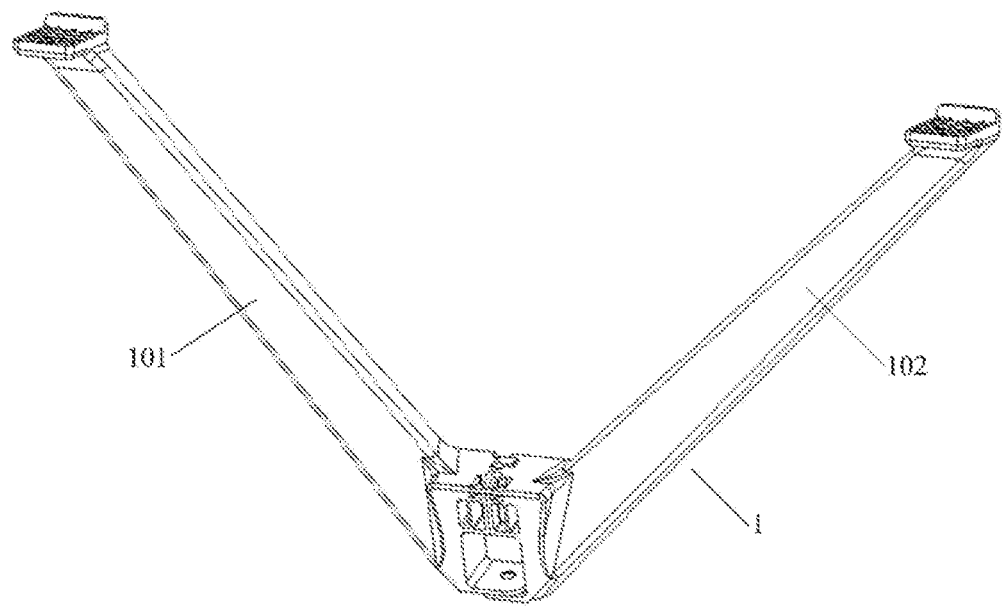
FIG. 1 is a schematic view showing the structure of a bracket of a load-bearing system of a floating photovoltaic power station according to an embodiment of the present application.

The technical solutions according to the embodiments of the present application will be described clearly and completely as follows in conjunction with the drawings in the embodiments of the present application. It is apparent that the described embodiments are only some of the embodiments according to the present application, rather than all the embodiments. Based on the embodiments in the present application, all of other embodiments, obtained by those skilled in the art without any creative efforts, fall into the protection scope of the present application.

As shown in FIGS. 1 to 20, a load-bearing system of a floating photovoltaic power station according to an embodiment of the present application includes an aisle floating body 4 providing buoyancy and forming a first operation and maintenance passage. The aisle floating body 4 is provided with a fixing portion 402 for fixedly connecting with a front side of a photovoltaic assembly 3, and one photovoltaic assembly 3 is only fixedly connected to one aisle floating body 4 located on the front side of the photovoltaic assembly.

It can be understood that, the front side of the photovoltaic assembly 3 only represents one side of the photovoltaic assembly 3, and there is no limitation on the front-rear direction.

In the load-bearing system of the floating photovoltaic power station according to the embodiments of the present application, the aisle floating body 4 providing buoyancy and forming the first operation and maintenance passage is fixedly connect with the front side of the photovoltaic assembly 3, so that the aisle floating body 4 can support the photovoltaic assembly 3, and can provide buoyancy at the same time. Compared with the floating body only providing buoyancy in the conventional technology, the number of components is reduced, thereby effectively reducing the cost.

Moreover, in the load-bearing system of the floating photovoltaic power station according to the embodiments of the present application, when the wave fluctuation causes displacement difference of the adjacent aisle floating bodies 4, since one photovoltaic assembly 3 is only fixedly connected to one aisle floating body 4 located on the front side thereof, the influence of the displacement difference on the single photovoltaic assembly 3 is effectively reduced, thereby reducing the probability of damage to the photovoltaic assembly 3 and prolonging the service life of the photovoltaic assembly 3.

The fixing portion 402 of the above aisle floating body 4 is configured to fixedly connect with the front side of the photovoltaic assembly 3. Specifically, the fixing portion 402 may be directly fixedly connected with the front side of the photovoltaic assembly 3, or the fixing portion 402 may be indirectly fixedly connected with the front side of the photovoltaic assembly 3 via other components, which is not limited in the embodiments of the present application.

In the above load-bearing system of the floating photovoltaic power station, one photovoltaic assembly 3 is only fixedly connected with one aisle floating body 4 located on the front side thereof, which includes two cases: one case is that the aisle floating body 4 on the front side of the photovoltaic assembly 3 is in one-to-one correspondence with the photovoltaic assembly 3, and the other case is that the aisle floating body on the front side of the photovoltaic assembly 3 corresponds to at least two photovoltaic assemblies 3. In order to minimize the influence of the above displacement difference on the photovoltaic assembly 3, the first case is preferably selected, that is, the photovoltaic assembly 3 is in one-to-one correspondence with the aisle floating body 4 on the front side thereof.

In order to improve the stability of the fixed connection of the photovoltaic assembly 3 and the aisle floating body 4, the aisle floating body 4 is provided with a hook 406 for fitting with a snap hole of the photovoltaic assembly 3 to prevent the photovoltaic assembly 3 from detaching.

The stability may also be improved by other means. For example, the aisle floating body 4 is provided with a first clamping portion 405 for pressing the photovoltaic assembly 3 against the fixing portion 402.

Figure 10:
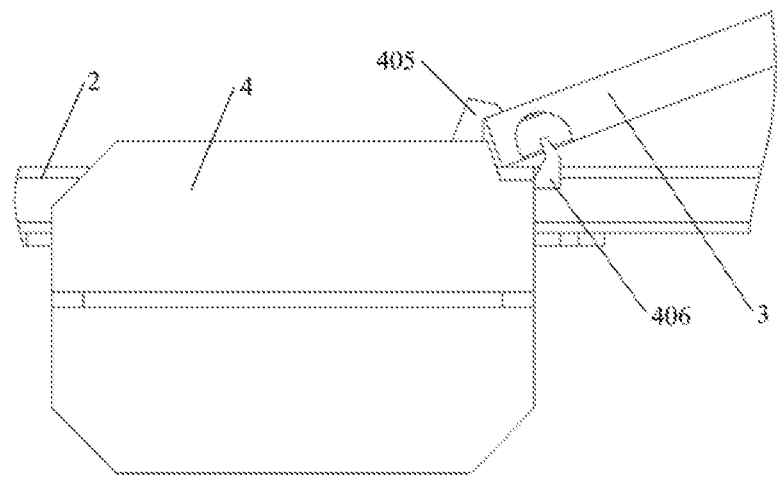
FIG. 10 is a schematic view showing the connection between the aisle floating body and the photovoltaic assembly in FIG. 6.
Figure 11:
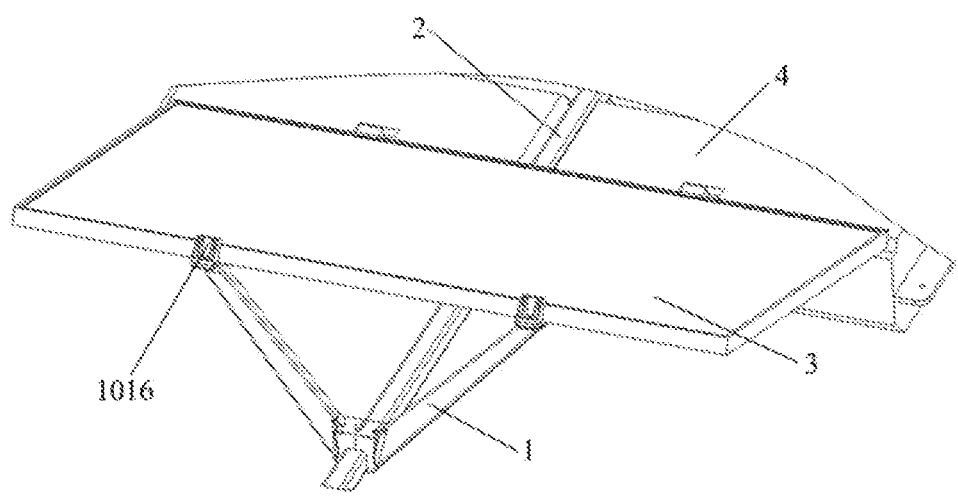
FIG. 11 is a schematic view showing the connection between the bracket and the photovoltaic assembly in FIG. 6.
Figure 12:
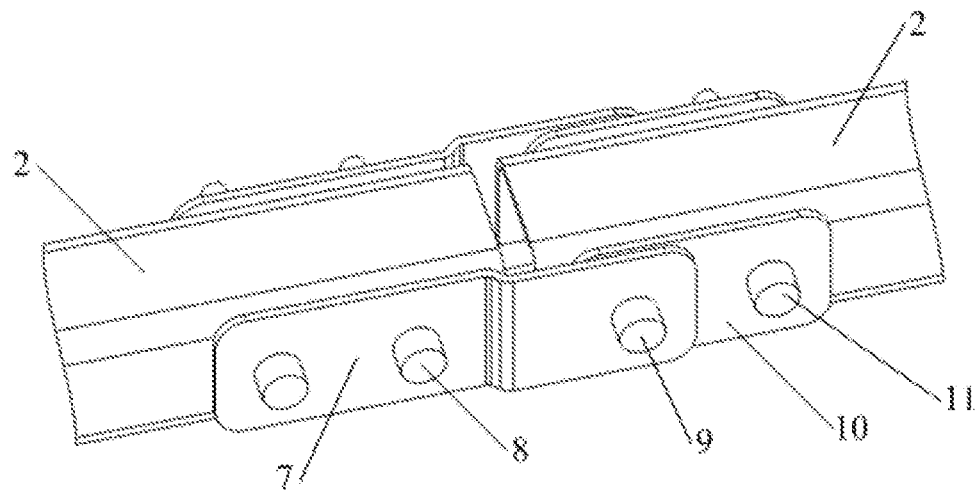
FIG. 12 is a schematic view showing the connection between two connecting rods in FIG. 6.
Figure 13:
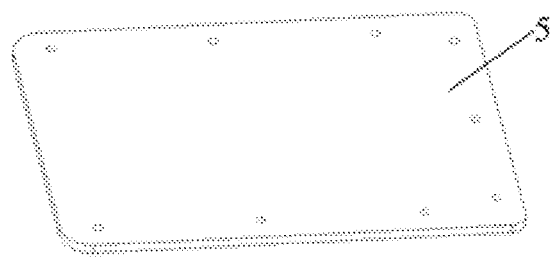
FIG. 13 is a schematic view showing the structure of the connection cover plate in FIG. 6.
Figure 14:
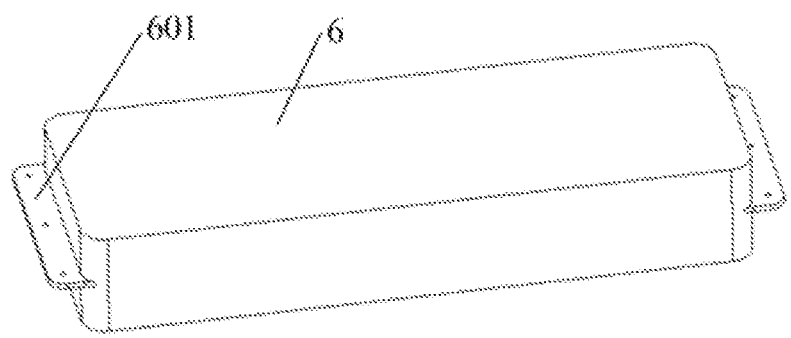
FIG. 14 is a schematic view showing the structure of the device floating body in FIG. 6.

In order to maximize the stability, it is preferred that the above aisle floating body 4 is provided with the hook 406 and the first clamping portion 405 at the same time, as shown in FIG. 10.

The specific structure and the number of the fixing portion 402, the hook 406, and the first clamping portion 405 are selected according to actual needs, which are not limited in the embodiments of the present application.

Figure 15:
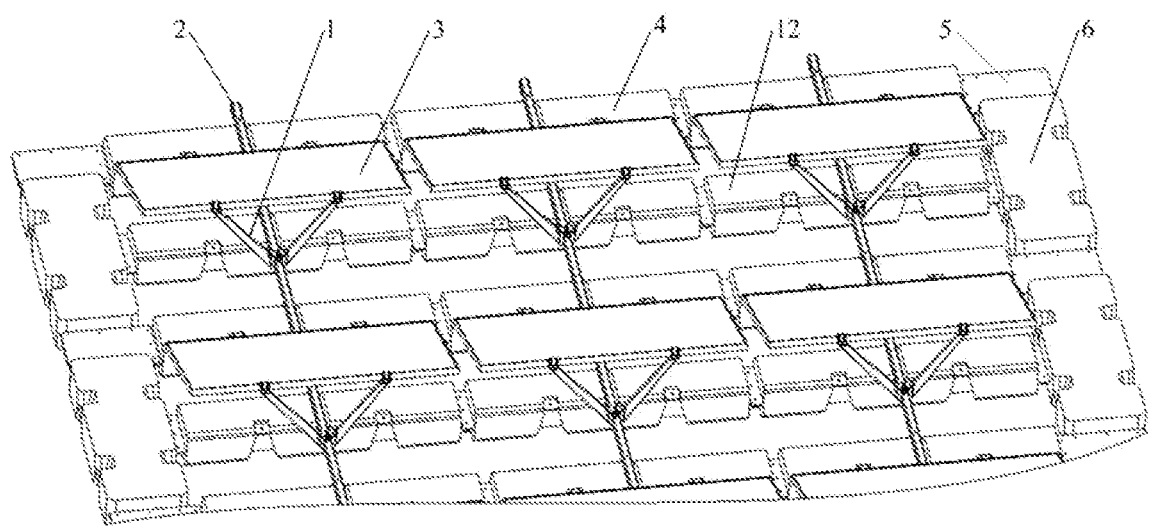
FIG. 15 is a schematic view showing another structure of the load-bearing system of the floating photovoltaic power station according to an embodiment of the present application.

As shown in FIG. 15, the load-bearing system of the floating photovoltaic power station further includes an auxiliary floating body 12 arranged in parallel with the aisle floating body 4 and forming a second operation and maintenance passage, and the auxiliary floating body 12 is fixedly connected with the aisle floating body 4. Specifically, the auxiliary floating body 12 and the aisle floating body 4 may be directly fixedly connected or indirectly fixedly connected with each other.

It can be understood that the auxiliary floating body 12 is located on one side of the aisle floating body 4 and located on a bottom side of the photovoltaic assembly 4. The buoyancy of the entire load-bearing system can be adjusted by adjusting the number of the auxiliary floating bodies 12.

In the above structure, the maintenance of the photovoltaic assembly 3 is also facilitated by providing the auxiliary floating body 12.

The structure of the above auxiliary floating body 12 may be referred to the aisle floating body 4. There may or may not be a gap between the auxiliary floating body 12 and the aisle floating body 4. In order to enlarge an exposed portion of the bottom side of the photovoltaic assembly 3, it is preferred that there is a gap between the auxiliary floating body 12 and the aisle floating body 4. The size of the gap is selected according to actual needs, which is not limited in the embodiments of the present application.

In order to improve the electric energy production capacity of the floating photovoltaic power station, at least two aisle floating bodies 4 are provided, and are arranged in rows in a predetermined direction, and two adjacent aisle floating bodies 4 in each row are fixedly connected. In this way, at least two photovoltaic assemblies 3 can be born, thereby increasing the electric energy production capacity.

In actual application, the above predetermined direction may be defined as a length direction or a width direction of the aisle floating body 4. In order to facilitate the fixed connection of the two adjacent aisle floating bodies 4 in each row of the aisle floating bodies 4, second connecting lugs 403 are provided at two ends of each aisle floating body 4.

It is also applicable that at least two of the above aisle floating bodies 4 are provided, and are arranged in columns. In this case, additional component needs to be provided to connect the adjacent aisle floating bodies 4.

There may be one row or at least two rows of the above aisle floating bodies 4. In a case that at least two rows of the aisle floating bodies 4 are provided, in order to ensure the connection of each row of the aisle floating bodies 4, the load-bearing system of the floating photovoltaic power station further includes a connection cover plate 5 fixedly connected with an end portion of each row of the aisle floating bodies 4, and a device floating body 6 fixedly connected with the two adjacent connection cover plates 5. In this case, one second connecting lug 403 of the aisle floating body 4 located at the end portion of each row is fixedly connected with the connection cover plate 5. In a case that the auxiliary floating body 12 is provided, the auxiliary floating body 12 is also arranged in rows in the above predetermined direction, and it is preferred that the connection cover plate 5 is fixedly connected with the auxiliary floating body 12 at the end portion of each row.

Preferably, the device floating body 6 and the connection cover plate 5 are distributed at two ends of each row of the aisle floating bodies 4. In this way, one can walk on the two ends of each row of the aisle floating bodies 4 and can perform installation from the two ends of each row of the aisle floating bodies 4, thereby improving the flexibility of the system.

Specifically, third connecting lugs 601 are provided at two ends of the above device floating body 6, the connection cover plate 5 is provided with a mounting hole to realize the fixed connection between the connection cover plate 5 and the device floating body 6, and to realize the fixed connection between the connection cover plate 5 and the aisle floating body 4. Other structures may be adopted to realize the fixed connection, which are not limited thereto.

The specific structures of the aisle floating body 4, the auxiliary floating body 12, the connection cover plate 5 and the device floating body 6 are designed according to actual needs. Preferably, at least one of the aisle floating body 4, the auxiliary floating body 12, the connection cover plate 5 and the device floating body 6 has a hollow structure. The hollow structure includes an enclosed housing, and the enclosed housing has a sealed chamber. The sealed chamber is an empty chamber, or the sealed chamber is provided with fillers. It can be understood that the density of the fillers is small, for example, the density of the fillers is smaller than the density of water.

In the load-bearing system of the floating photovoltaic power station, the two adjacent aisle floating bodies 4 in each row of aisle floating bodies 4 may be directly fixedly connected or indirectly fixedly connected with each other. If the two adjacent aisle floating bodies 4 in each row are indirectly fixedly connected, the two adjacent aisle floating bodies 4 in each row are indirectly fixedly connected with each other via a connecting component, which may be a connecting floating body capable of providing buoyancy. The connecting component may be a component that does not provide buoyancy, which is not limited in the embodiments of the present application.

In order to further optimize the above technical solutions, the load-bearing system of the floating photovoltaic power station further includes a support bracket for fixedly connecting with a rear side of the photovoltaic assembly 3. One end of the support bracket is fixedly connected with the aisle floating body 4 located on the front side of the photovoltaic assembly 3, and another end of the support bracket is fixedly connected with the aisle floating body 4 located on the rear side of the photovoltaic assembly 3.

It can be understood that the above support bracket is provided with a mounting portion for fixed connecting with the rear side of the photovoltaic assembly 3. The rear side of the photovoltaic assembly 3 is opposite to the front side of the photovoltaic assembly 3, that is, the front side and the rear side of the photovoltaic assembly 3 may be arranged at a same height or at different heights. In order to improve the power generation efficiency, it is preferred that the front side and the rear side of the photovoltaic assembly 3 are arranged at different heights. Specifically, the front side of the photovoltaic assembly 3 is higher than the rear side of the photovoltaic assembly 3, or the front side of the photovoltaic assembly 3 is lower than the rear side of the photovoltaic assembly 3. In this case, the mounting portion on the support bracket and the fixing portion 402 on the aisle floating body 4 are not arranged at different heights.

Specifically, in a case that the auxiliary floating body 12 is provided, it is preferred that the auxiliary floating body 12 is fixedly connected to the aisle floating body 4 through the support bracket. Specifically, the auxiliary floating body 12 is fixedly connected to the support bracket.

After the photovoltaic assembly 3 is installed in the load-bearing system of the floating photovoltaic power station, the exposed portion of the bottom side of the photovoltaic assembly 3 can be increased, thereby increasing the air flow between the photovoltaic assembly and the water surface, improving the cooling effect, reducing the operating temperature of the photovoltaic assembly, improving the power generation efficiency, meeting the needs of double-sided power generation components, and improving versatility.

Figure 16:
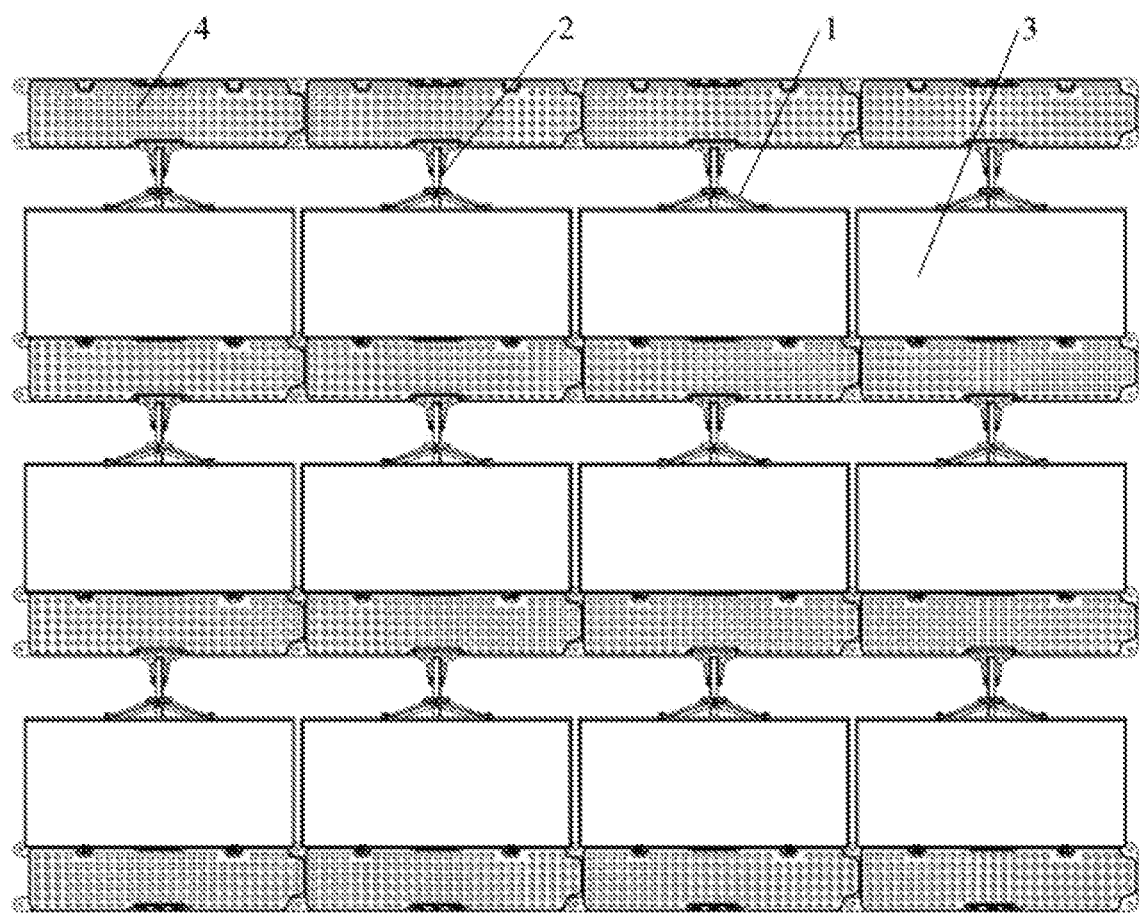
FIG. 16 is a schematic view showing yet another structure of the load-bearing system of the floating photovoltaic power station according to an embodiment of the present application.
Figure 17:
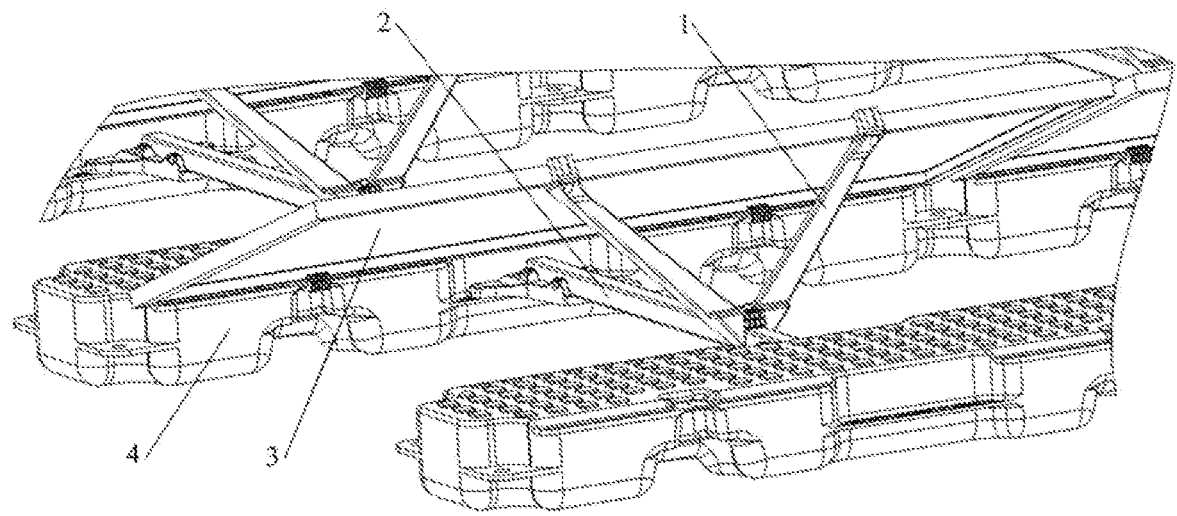
FIG. 17 is a partially enlarged view of FIG. 16.
Figure 18:
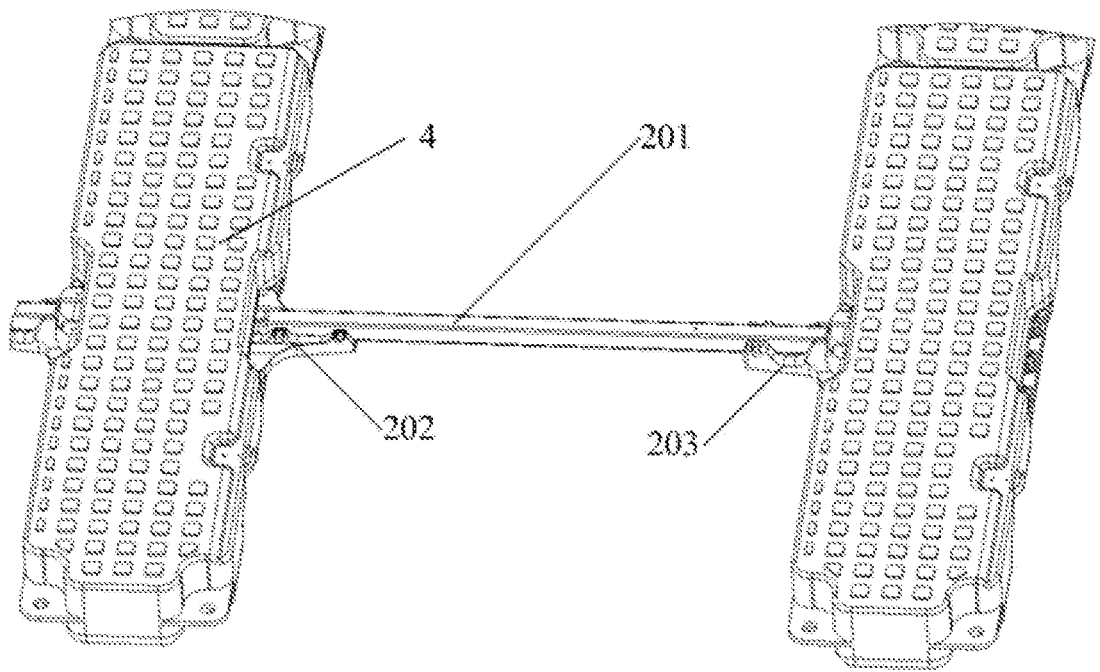
FIG. 18 is a schematic view showing the connection between the connecting rod and the aisle floating body in FIG. 16.

There are two types of relative positional relationship between the support bracket and the aisle floating body 4, one is that the support bracket spans the aisle floating body 4, as shown in FIGS. 6 to 8 and 15; the other is that the support bracket does not span the aisle floating body 4, that is, in the length direction of the support bracket, the support bracket is located between the two adjacent aisle floating bodies 4, as shown in FIGS. 16 to 18.

In the load-bearing system of the floating photovoltaic power station, only one of the manners may be selected, or the above two manners may be both selected.

Figure 9:
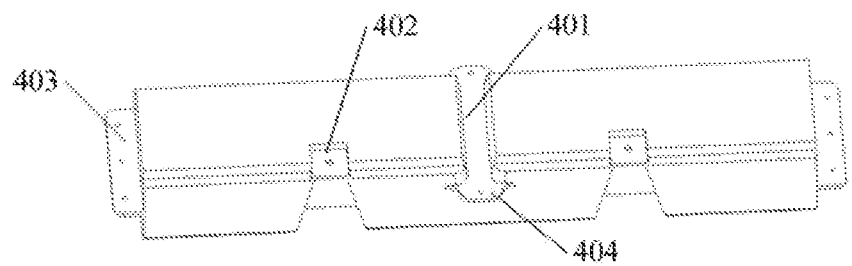
FIG. 9 is a schematic view showing the structure of the aisle floating body in FIG. 6.

In a case that the above support bracket spans the aisle floating body 4, in order to facilitate the spanning, the aisle floating body 4 is provided with an avoidance groove 401 for accommodating the support bracket. For ease of installation, the aisle floating body 4 is provided with first connecting lugs 404. As shown in FIG. 9, the first connecting lugs 404 are located at two ends of the avoidance groove 401, and the first connecting lugs 404 are fixedly connected to the connecting rod 2.

When the load-bearing system of the floating photovoltaic power station is in use, wave fluctuations may cause displacement difference between the aisle floating bodies 4 of adjacent rows, and the displacement difference will be directly transferred to the photovoltaic assembly 3, resulting in a certain amount of deformation of the photovoltaic assembly 3. If the amount of deformation exceeds a certain range, the photovoltaic assembly 3 will be irreversibly damaged, for example, a crack phenomenon that is invisible to the naked eye occurs inside the photovoltaic assembly 3, resulting in low power generation efficiency.

In order to overcome the above problem, in the case that the support bracket spans the aisle floating body 4, at least two support brackets are provided, and the support brackets are opposite end to end, and the two support brackets that are opposite end to end are rotatably connected in a vertical plane. In this case, the support brackets are opposite end to end along the length direction thereof, and a rotation axis of the support bracket is parallel or relatively inclined to a width direction of the support bracket.

It can be understood that, the end to end opposition of the two support brackets refers to that a head end of one support bracket is opposite to a tail end of another support bracket. In the two support brackets that are opposite end to end, the head end of one support bracket is rotatably connected to the tail end of the other support bracket.

Various structures may be provided to achieve the above ratable connection. In order to simplify the structure, it is preferred to implement the connection through a rotating shaft. Specifically, in the two support brackets that are opposite end to end, a first connecting sheet 7 is fixed on one support bracket, and a second connecting sheet 10 is fixed on the other support bracket. The second connecting sheet 10 is rotatably connected with the first connecting sheet 7 through a first rotating shaft 9, and the first rotating shaft 9 is rotatably arranged on one support bracket. For ease of installation, it is preferred that, the first connecting sheet 7 is fixed to one support bracket by a first pin shaft 8, and the second connecting sheet 10 is fixed to the other support bracket by a second pin shaft 11.

Further, two first connecting sheets 7 are provided and respectively located on two sides of one support bracket, and two second connecting sheets 10 are provided and respectively located on two sides of the other support bracket, thereby improving stability and avoiding the support bracket from moving in its width direction during the rotation process.

In the case that the support bracket is located between the two adjacent aisle floating bodies 4 in the length direction of the support bracket, in order to overcome the above problem, the support bracket includes: a support bracket body 201, and connecting portions fixedly connected to the aisle floating body 4, wherein two connecting portions are provided and respectively connected to two ends of the support bracket body 201, and the at least one connecting portion is rotatably connected with the support bracket body 201 in the vertical plane. In this case, a rotation axis of the connecting portion is parallel or relatively inclined to the width direction of the support bracket body 201.

Preferably, at least one connecting portion is provided with a position-limiting component 206 for limiting a movement of the support bracket body 201 in the width direction thereof. In this way, the support bracket is avoided from moving along its width direction during the rotation process, which improves the stability. In order to improve the reliability of the position limiting, it is preferred that the position-limiting component 206 is provided at the connecting portion rotatably connected to the support bracket body 201.

Figure 19:
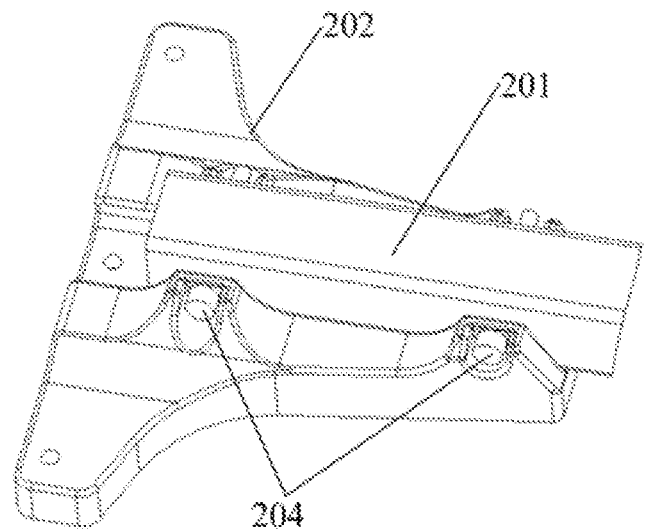
FIG. 19 is a schematic view showing the structure of one end of the connecting rod in FIG. 16.
Figure 20:
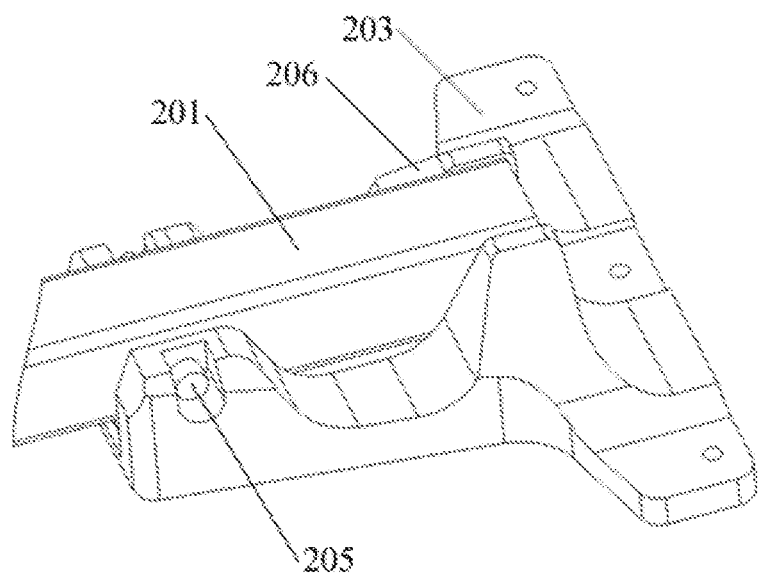
FIG. 20 is a schematic view showing the structure of another end of the connecting rod in FIG. 16.

Specifically, as shown in FIGS. 18 to 20, the two connecting portions are respectively a first connecting portion 202 and a second connecting portion 203. The first connecting portion 202 is fixedly connected with the support bracket body 201, and the second connecting portion 203 is provided with a second rotating shaft 205. The support bracket body 201 is rotatably arranged on the second rotating shaft 205, and the position-limiting component 206 is arranged on the second connecting portion 203. In order to facilitate the installation, the first connecting portion 202 is fixedly connected with the support bracket body 201 by a third pin shaft 204.

The rotatable connection may be realized by other structures, which is not limited to the above embodiments.

It should be noted that the vertical plane mentioned herein is perpendicular to the water surface, and the water surface refers to a water surface without waves.

In order to improve the stability of the fixed connection of the support bracket and the aisle floating body 4, the support bracket is further provided with a second clamping portion 1016 for pressing the photovoltaic assembly 3 against the support bracket.

The second clamping portion 1016 may be other structures such as a pressing plate or a pressing block. The specific structure of the second clamping portion 1016 may be selected according to actual needs, which is not limited in the embodiments of the present application.

In the above load-bearing system of the floating photovoltaic power station, the specific structure of the support bracket may be selected according to actual needs. Preferably, the support bracket includes: a connecting rod 2, and a bracket 1 fixedly connected to the connecting rod 2; wherein the bracket is configured to fixedly connect with the rear side of the photovoltaic assembly 3, one end of the connecting rod 2 is fixedly connected with the aisle floating body 4 located on the front side of the photovoltaic assembly 3, and another end of the connecting rod 2 is fixedly connected with the aisle floating body 4 located on the rear side of the photovoltaic assembly 3.

In the above structure, in a case that the support bracket includes the support bracket body 201 and the connecting portions, the support bracket body 201 includes a part of the connecting rod 2 and the bracket 1, and the connecting portions are the two end portions of the connecting rod 2.

The structure of the above support bracket is relatively simple, and covers a small area of the water surface. The above support bracket may also be selected as other structures, and is not limited thereto.

In the load-bearing system of the floating photovoltaic power station, an inclination angle of the photovoltaic assembly 3 can be adjusted by adjusting a position of the bracket 1 on the connecting rod 2, thereby improving flexibility. Moreover, the photovoltaic assembly 3 can be provided at a large inclination angle to meet the requirements for use in high latitude areas.

In order to facilitate adjustment of the inclination angle of the photovoltaic assembly 3, the bracket 1 is detachably fixedly connected to the connecting rod 2.

The above bracket 1 may be V-shaped or other shapes, which is not limited in the embodiments of the present application.

The above bracket 1 may be of an integrated structure or a split structure. In order to facilitate manufacturing and production, the above bracket 1 is preferably selected as a split structure. As shown in FIGS. 1 to 5, it is preferred that the bracket 1 includes: a first sub-bracket body 101 and a second sub-bracket body 102 which are spliced and fixedly connected with each other, and a mounting structure is formed at a splicing position of the first sub-bracket body 101 and the second sub-bracket body 102, and the connecting rod 2 passes through the mounting structure.

The above bracket 1 may be of other types of split structures, and is not limited to the above embodiments.

The above first sub-bracket body 101 and the second sub-bracket body 102 may be first spliced and then fixedly connected, or the two may be fixedly connected while being spliced. For ease of installation, the former is preferred. For ease of maintenance, the first sub-bracket body 101 and the second sub-bracket body 102 are detachably fixedly connected. In a case that the bracket 1 is V-shaped, the splicing position of the first sub-bracket 101 and the second sub-bracket 102 is located at a tip end of the V-shape.

The above bracket 1 is designed as the split structure. Therefore, the first sub-bracket body 101 and the second sub-bracket body 102 can be produced first, and then the first sub-bracket body 101 and the second sub-bracket body 102 are spliced and fixedly connected. Compared with the direct production of the integrated bracket, the mold volume is effectively reduced, the manufacturing difficulty is reduced, and the production efficiency is improved.

In the above bracket 1, the specific type of the mounting structure is designed according to actual needs. For example, the mounting structure may be a closed annular structure or an annular structure having an opening. The above annular structure may be a circular ring shape, a square ring shape or the like. In order to increase a contact area between the connecting rod 2 and the bracket 1, and to improve the stability, it is preferred that the mounting structure is a closed annular structure.

The first sub-bracket body 101 and the second sub-bracket body 102 are fixedly connected, and the two may be fixedly connected at the splicing position or at other positions. For ease of installation, it is preferred that the first sub-bracket body 101 and the second sub-bracket body 102 are fixedly connected at the splicing position, which facilitates the fixed connection between the connecting rod 2 and the bracket 1 as well.

Further, the above connecting rod 2, the first sub-bracket body 101 and the second sub-bracket body 102 are fixedly connected by a same connecting component. For ease of disassembly, the connecting rod 2, the first sub-bracket body 101 and the second sub-bracket body 102 are detachably fixedly connected by the same connecting component. The above connecting component may be a threaded connecting component, a pin or the like, which is not limited in the embodiments of the present application.

The first sub-bracket body 101 and the second sub-bracket body 102 may be fixedly connected by means of bonding, snap-engagement or the like. In order to improve the reliability, it is preferred that the first sub-bracket body 101 and the second sub-bracket body 102 are fixedly connected by the connecting component. The connecting component may be a threaded connecting component, a pin or the like.

In a case that the above connecting component is the threaded connecting component, in order to improve the connection strength, the above bracket further includes a washer 107 used in conjunction with the threaded connecting component. The first sub-bracket body 101 is provided with a first mounting hole 1012 for accommodating the washer 107, and the second sub-bracket body 102 is provided with a second mounting hole 1013 for accommodating the washer 107. A radius of the washer 107 is gradually changed along an axial direction of the washer, and axes of the first mounting hole 1012, the second mounting hole 1013, and the washer 107 do not coincide, such that the first sub-bracket boy 101 and the second sub-bracket body 102 move toward each other, when the washer 107 moves in a direction in which the radius thereof decreases.

Figure 2:
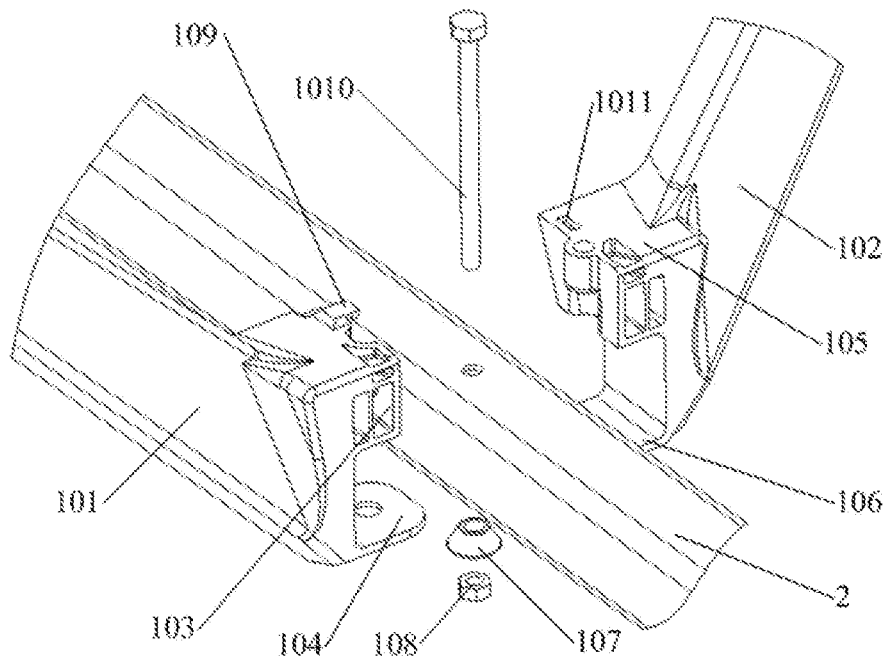
FIG. 2 is an exploded view showing the bracket and the connecting rod in FIG. 1.
Figure 3:
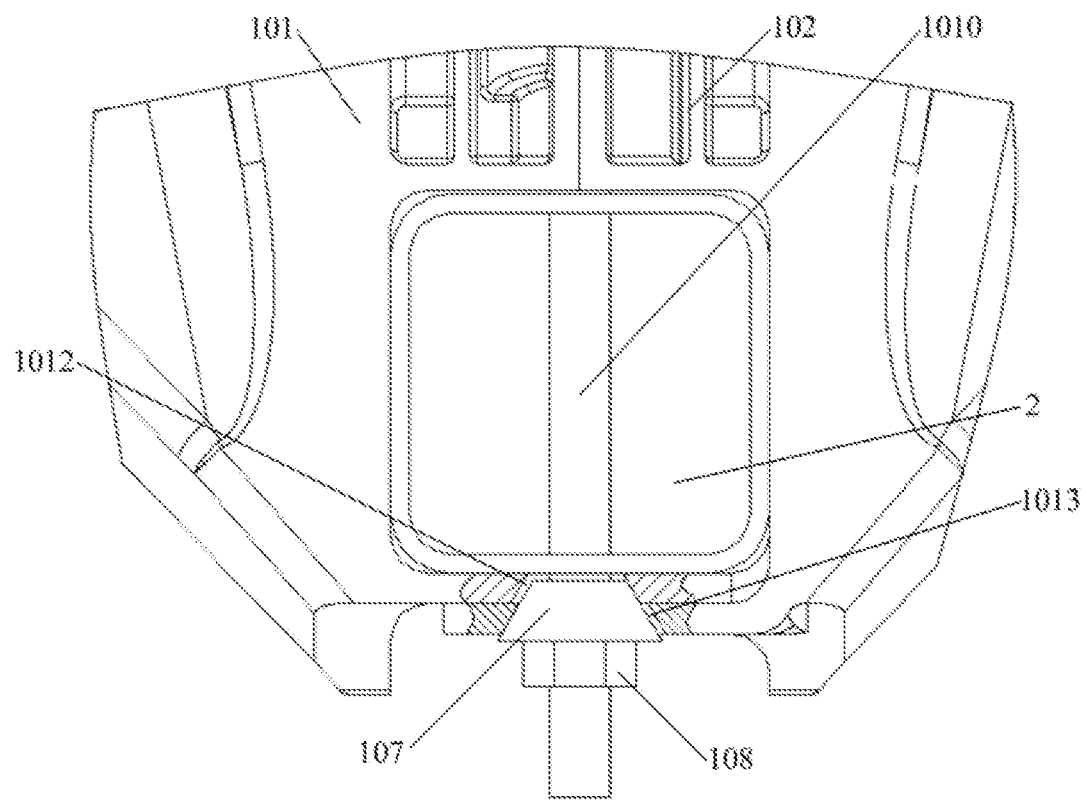
FIG. 3 is a schematic view showing the connection between the bracket and the connecting rod in FIG. 1.
Figure 4:
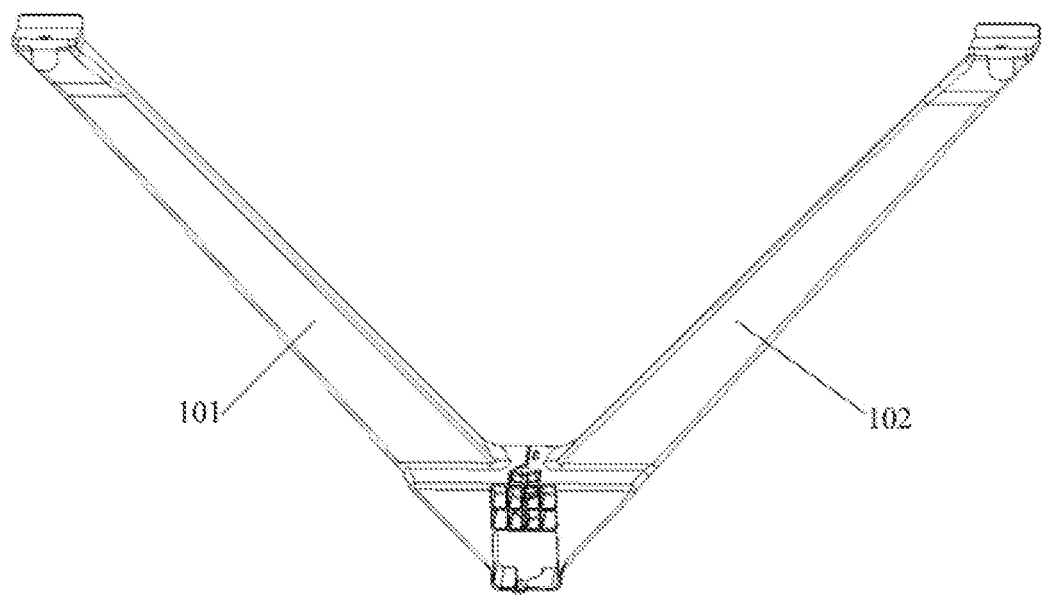
FIG. 4 is a schematic view showing another structure of the bracket of the load-bearing system of the floating photovoltaic power station according to an embodiment of the present application.

Since the radius of the washer 107 is gradually changed along the axial direction thereof, a generatrix of a circumferential side surface of the washer 107 may be a straight line which is inclined with respect to the axis of the washer 107 or an arc. In a case that the generatrix of the circumferential side surface of the washer 107 is a straight line inclined with respect to the axis of the washer 107, the washer 107 has a truncated cone shape as shown in FIGS. 2 and 3. The shapes of the first mounting hole 1012 and the second mounting hole 1013 are the same as that of the washer 107. When the washer 107 moves in the direction in which the radius thereof decreases, the circumferential side surface of the washer 107 acts on the first sub-bracket body 101 and the second sub-bracket body 102 to push the first sub-bracket body 101 and the second sub-bracket body 102 to move toward each other.

Since the axes of the first mounting hole 1012, the second mounting hole 1013, and the washer 107 do not coincide with each other, a first clearance is formed between the washer 107 and a wall of the first mounting hole 1012, and a second clearance is formed between the washer 107 and a wall of the second mounting hole 1013. The first clearance and the second clearance are respectively located on two sides of the axis of the washer 107. A portion of the washer 107 attached to the wall of the first mounting hole 1012 and a portion of the washer 107 attached to the wall of the second mounting hole 1013 are respectively located on two sides of the axis of the washer 107, as shown in FIG. 3.

In the above structure, during the mounting process, the washer 107 moves in a direction in which the radius thereof decreases, so that the first sub-bracket body 101 and the second sub-bracket body 102 move toward each other, separation of the first sub-bracket body 101 and the second sub-bracket 102 is avoided, and the connection between the first sub-bracket body 101 and the second sub-bracket body 102 is more stable, thereby improving the connection strength.

Specifically, in a case that the first sub-bracket body 101 and the second sub-bracket body 102 are fixedly connected by a bolt 1010 and a nut 108, it is preferred that the washer 107 and the nut 108 are located at a same end of the bolt 1010, as shown in FIG. 3.

In the above bracket 1, the separation of the first sub-bracket body 101 and the second sub-bracket body 102 may be avoided by other means. For example, the bracket 1 further includes: a position-limiting structure provided at the splicing position for preventing the first sub-bracket body 101 and the second sub-bracket body 102 from moving away from each other.

The above position-limiting structure may be a snap-engagement structure or a magnet adsorption structure. For ease of implementation, it is preferred that the position-limiting structure is a snap-engagement structure. Specifically, as shown in FIGS. 2 and 5, the above position-limiting structure includes a snap groove 1011 and a snap hook 109 which are in snap-engagement with each other, wherein one of the snap groove 1011 and the snap hook 109 is arranged at the splicing position of the first sub-bracket body 101, and the other is arranged at the splicing position of the second sub-bracket body 102.

The number and shape of the snap hook 109 may be selected according to actual needs as long as the function of the snap hook can be realized, which are not limited in the embodiments of the present application.

The mounting structure is formed at the splicing position of the first sub-bracket body 101 and the second sub-bracket body 102, and various structures exist according to the shape of the mounting structure. Specifically, in a case that the mounting structure is the closed annular structure, as shown in FIGS. 2 to 5, a first upper connecting portion 103 is provided at a top end of the splicing position of the first sub-bracket body 101, and a second upper connecting portion 105 is provided at the top end of the splicing position of the second sub-bracket body 102. A first lower connecting portion 104 is provided at a bottom end of the splicing position of the first sub-bracket body 101, and a second lower connecting portion 106 is provided at the bottom end of the splicing position of the second sub-bracket body 102. The first upper connecting portion 103 is spliced with the second upper connecting portion 105, and the first lower connecting portion 104 is spliced with the second lower connecting portion 106.

Figure 5:
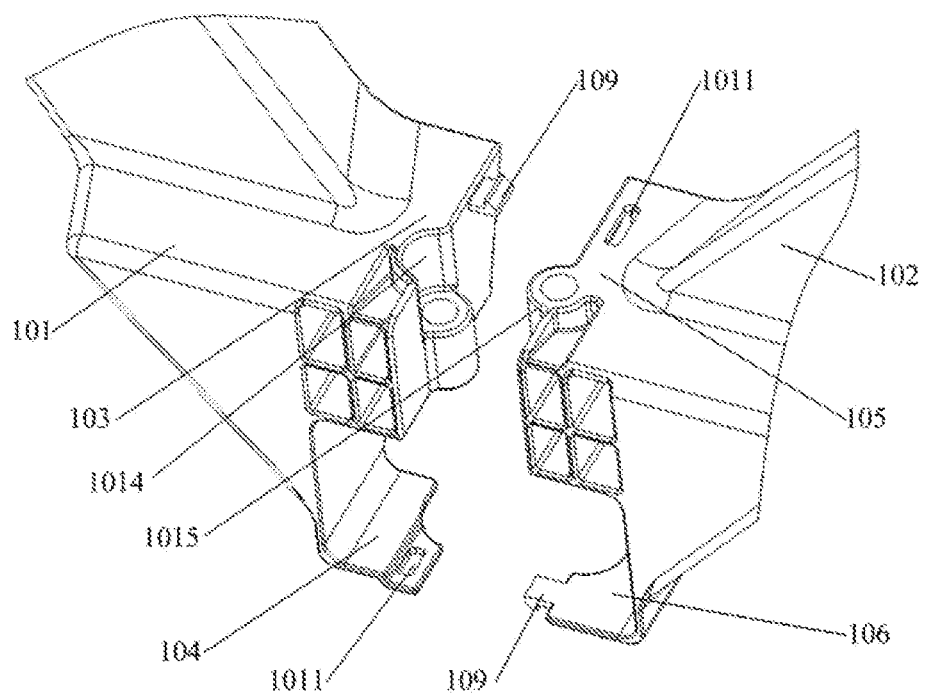
FIG. 5 is an exploded view of the bracket in FIG. 4.
Figure 6:
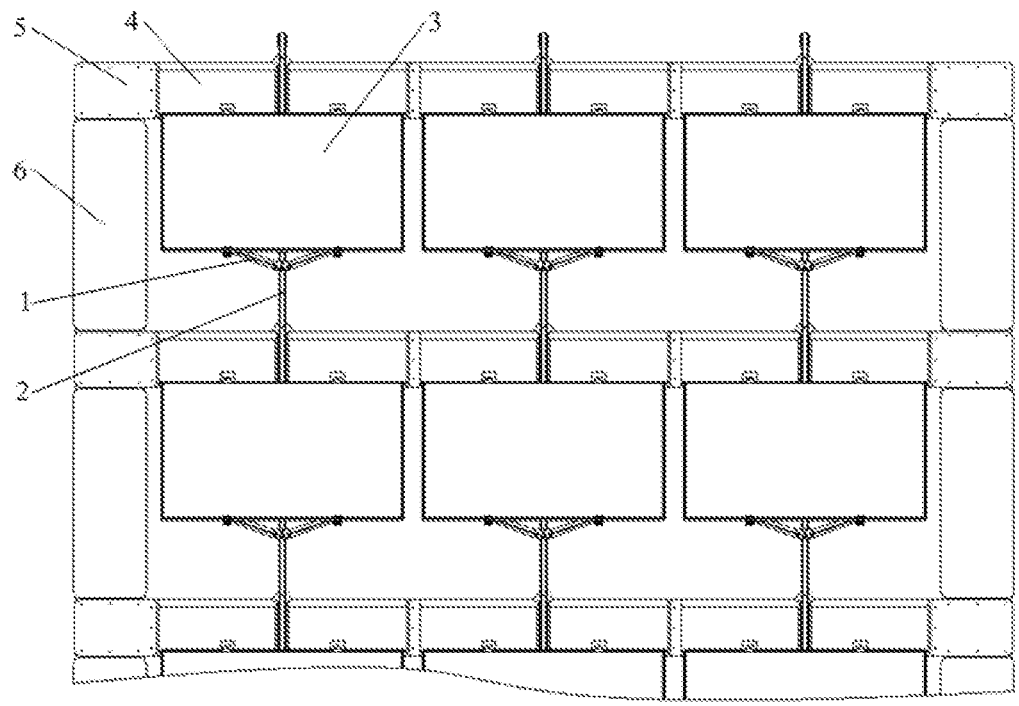
FIG. 6 is a schematic view showing a structure of the load-bearing system of the floating photovoltaic power station according to an embodiment of the present application.
Figure 7:
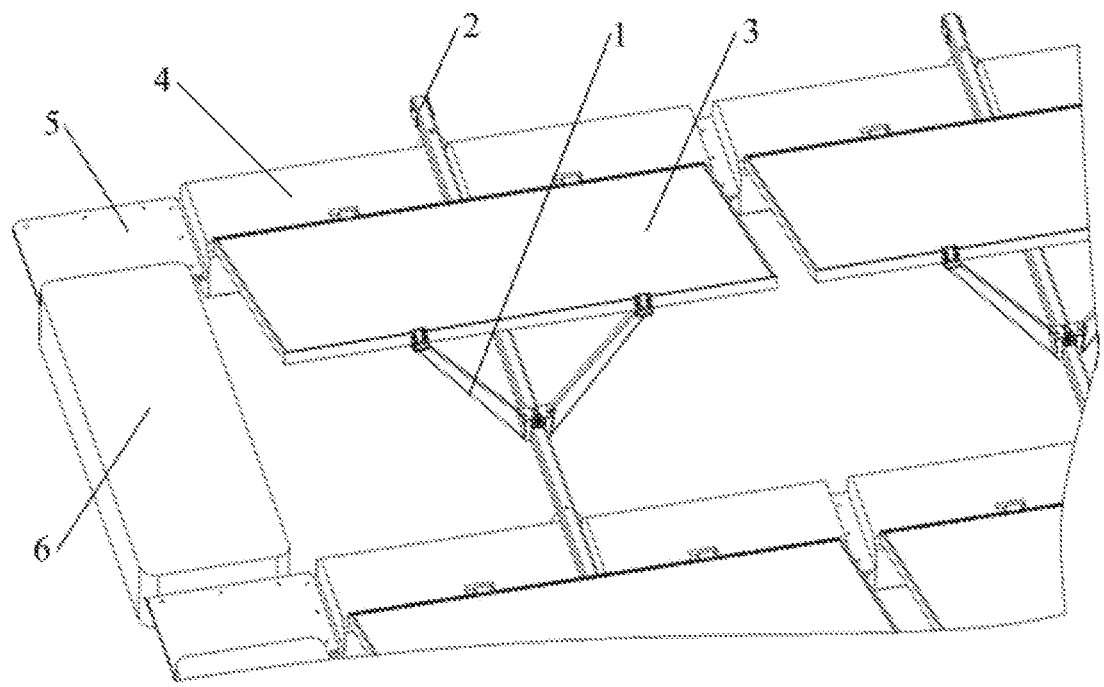
FIG. 7 is a partially enlarged view of FIG. 6.
Figure 8:
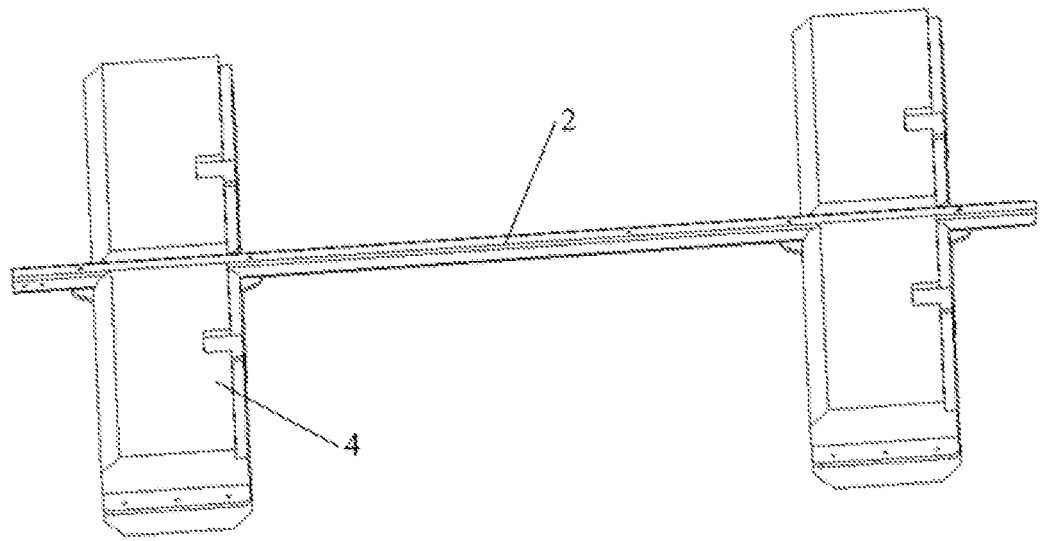
FIG. 8 is a schematic view showing the connection between the connecting rod and the aisle floating body in FIG. 6.

In the above bracket, if the position-limiting structure for preventing the first sub-bracket body 101 and the second sub-bracket body 102 from moving away from each other is provided, the position-limiting structure may be provided on the first upper connecting portion 103 and the second upper connecting portion 105, as shown in FIG. 2; or the position-limiting structure may be provided on the first lower connecting portion 104 and the second lower connecting portion 106; or the position-limiting structure may be provided on the first upper connecting portion 103, the second upper connecting portion 105, the first lower connecting portion 104, and the second lower connecting portion 106, as shown in FIG. 5.

In the above bracket, if the washer 107 is provided, the washer 107 may be provided on the first upper connecting portion 103 and the second upper connecting portion 105, or may be provided on the first lower connecting portion 104 and the second lower connecting portion 106.

In a case that the mounting structure is the annular structure having an opening, the first sub-bracket body 101 is provided with only the first upper connecting portion 103, and the second sub-bracket body 102 is provided with only the second upper connecting portion 105; or the first sub-bracket body 101 is provided with only the first lower connecting portion 104, and the second sub-bracket body 102 is provided with only the second lower connecting portion 106.

A splicing manner of the first upper connecting portion 103 and the second upper connecting portion 105 may be overlapping or butting, and a splicing manner of the first lower connecting portion 104 and the second lower connecting portion 106 may be overlapping or butting. For example, as shown in FIGS. 1 and 2, the first upper connecting portion 103 and the second upper connecting portion 105 are butted, and the first lower connecting portion 104 and the second lower connecting portion 106 are overlapped. Other combinations may be selected, and the selection is made according to actual needs in the actual application process.

In a case that the first sub-bracket body 101 is provided with the first upper connecting portion 103 and the first lower connecting portion 104, and the second sub-bracket body 102 is provided with the second upper connecting portion 105 and the second lower connecting portion 106, in order to simplify the fixed connection between the sub-bracket body 101 and the second sub-bracket body 102, it is preferred that the first upper connecting portion 103, the second upper connecting portion 105, the first lower connecting portion 104, and the second lower connecting portion 106 are fixedly connected by the same connecting component.

It is also applicable to separately fixedly connect the first upper connecting portion 103 and the second upper connecting portion 105, and separately fixedly connect the first lower connecting portion 104 and the second lower connecting portion 106, which is not limited to the above embodiments.

In a case that the splicing manner of the first upper connecting portion 103 and the second upper connecting portion 105 and the splicing manner of the first lower connecting portion 104 and the second lower connecting portion 106 are both butting, the butting structure is a concave-convex butting structure, if the first upper connecting portion 103 and the second upper connecting portion 105, and the first lower connecting portion 104 and the second lower connecting portion 106 are fixedly connected by the connecting component, as shown in FIG. 5. The first upper connecting portion 103 and the second upper connecting portion 105 are butted by the concave-convex butting structure, and the concave-convex butting structure includes an avoidance groove 1014 and a boss 1015. Each of the first upper connecting portion 103 and the second upper connecting portion 105 is provided with the avoidance groove 1014 and the boss 1015, the avoidance groove 1014 on the first upper connecting portion 103 is engaged with the boss 1015 of the second upper connecting portion 105, and the boss 1015 on the first upper connecting portion 103 is engaged with the avoidance groove 1014 of the second upper connecting portion 105.

The shapes of the first upper connecting portion 103, the second upper connecting portion 105, the first lower connecting portion 104, and the second lower connecting portion 106 are selected according to actual needs, which are not limited in the embodiments of the present application.

In order to improve corrosion resistance, the first sub-bracket body 101 and the second sub-bracket body 102 are both polymer material components, and the polymer material components are polypropylene components or nylon components. In order to improve the mechanical properties of the first sub-bracket body 101 and the second sub-bracket body 102, it is preferred that the first sub-bracket body 101 and the second sub-bracket body 102 are reinforced polypropylene components or reinforced nylon components. The first sub-bracket 101 and the second sub-bracket 102 may be made of other materials according to other requirements, which are not limited thereto.

Based on the load-bearing system of a floating photovoltaic power station according to the above embodiments, a floating photovoltaic power station is further provided by the embodiments of the present application. The floating photovoltaic power station includes: a photovoltaic assembly 3 and a load-bearing system bearing the photovoltaic assembly 3, wherein the load-bearing system is the load-bearing system of the floating photovoltaic power station described in the above embodiments.

Since the load-bearing system of the floating photovoltaic power station has the above technical effects, and the above floating photovoltaic power station has the load-bearing system of the floating photovoltaic power station, the floating photovoltaic power station also has the corresponding technical effects, which will not be described herein.

Based on the above description of the disclosed embodiments, the present application can be implemented or used by those skilled in the art. Various modifications to these embodiments are apparent to those skilled in the art, and the general principle defined herein may be implemented in other embodiments without departing from the spirit or scope of the present application. Therefore, the present application is not limited to these embodiments illustrated herein, but should be defined by the broadest scope consistent with the principle and novel features disclosed herein.

The invention claimed is:

1. A load-bearing system of a floating photovoltaic station, comprising:
a plurality of aisle floating bodies providing buoyancy and forming a first operation and maintenance passage, and
a plurality of support brackets,
wherein each of the plurality of aisle floating bodies is provided with a fixing portion for fixedly connecting with a front side of one photovoltaic assembly, and the aisle floating body is fixedly connected to the one photovoltaic assembly by the fixing portion,
wherein each of the plurality of support brackets is fixedly connected with a rear side of a corresponding photovoltaic assembly, one end of the support bracket is fixedly connected with the aisle floating body located on the front side of the photovoltaic assembly at a middle position of the aisle floating body, and another end of the support bracket is fixedly connected with the aisle floating body located on the rear side of the photovoltaic assembly at a middle position of the aisle floating body.

2. The load-bearing system according to claim 1, wherein the aisle floating body is provided with a hook for fitting with a snap hole of the photovoltaic assembly to prevent the photovoltaic assembly from detaching, and/or a first clamping portion for pressing the photovoltaic assembly against the fixing portion.

3. The load-bearing system according to claim 1, further comprising an auxiliary floating body arranged in parallel with the aisle floating body and forming a second operation and maintenance passage, wherein the auxiliary floating body is fixedly connected with the aisle floating body.

4. The load-bearing system according to claim 1, wherein at least two aisle floating bodies are provided, and are arranged in rows in a predetermined direction, and two adjacent aisle floating bodies in each row are fixedly connected.

5. The load-bearing system according to claim 4, wherein at least two rows of the aisle floating bodies are provided, and the load-bearing system further comprises a connection cover plate fixedly connected with an end portion of each row of the aisle floating bodies, and a device floating body fixedly connected with two adjacent connection cover plates.

6. The load-bearing system according to claim 5, wherein at least one of the aisle floating body, the connection cover plate and the device floating body has a hollow structure, the hollow structure comprises an enclosed housing, the enclosed housing has a sealed chamber, and the sealed chamber is an empty chamber, or the sealed chamber is provided with fillers.

7. The load-bearing system according to claim 4, wherein the two adjacent aisle floating bodies in each row are fixedly connected by a connecting floating body.

8. The load-bearing system according to claim 1, wherein the support bracket is configured to span the aisle floating body, and the aisle floating body is provided with an avoidance groove for accommodating the support bracket.

9. The load-bearing system according to claim 8, wherein at least two of the support brackets are arranged end to end, and the two support brackets arranged end to end are rotatably connected in a vertical plane.

10. The load-bearing system according to claim 1, wherein in a length direction of the support bracket, the support bracket is located between the two adjacent aisle floating bodies.

11. The load-bearing system according to claim 10, wherein the support bracket comprises a support bracket body, and connecting portions fixedly connected to the aisle floating body, wherein two connecting portions are provided and respectively connected to two ends of the support bracket body, and at least one of the connecting portions is rotatably connected with the support bracket body in the vertical plane.

12. The load-bearing system according to claim 11, wherein at least one connecting portion is provided with a position-limiting component for limiting a movement of the support bracket body in a width direction of the support bracket body.

13. The load-bearing system according to claim 1, wherein the support bracket is provided with a second clamping portion for pressing the photovoltaic assembly against the support bracket.

14. The load-bearing system according to claim 1, wherein the support bracket comprises a connecting rod, and a bracket fixedly connected to the connecting rod, wherein the bracket is configured to fixedly connect with the rear side of the photovoltaic assembly, one end of the connecting rod is fixedly connected with the aisle floating body located on the front side of the photovoltaic assembly, and another end of the connecting rod is fixedly connected with the aisle floating body located on the rear side of the photovoltaic assembly.

15. The load-bearing system according to claim 14, wherein the bracket comprises a first sub-bracket body and a second sub-bracket body which are spliced and fixedly connected with each other, and a mounting structure is formed at a splicing position of the first sub-bracket body and the second sub-bracket body, and the connecting rod passes through the mounting structure.

16. The load-bearing system according to claim 15, wherein the mounting structure is a closed annular structure.

17. The load-bearing system according to claim 15, wherein the connecting rod, the first sub-bracket body and the second sub-bracket body are fixedly connected by a same connecting component.

18. A floating photovoltaic power station, comprising a photovoltaic assembly and a load-bearing system bearing the photovoltaic assembly, wherein the load-bearing system is the load-bearing system according to claim 1.

* * * * *